(12) United States Patent
Gonthier (10) Patent No.: US 8,891,920 B2
(45) Date of Patent: Nov. 18, 2014

(54) METHOD AND DEVICE FOR OPTICALLY COUPLING OPTICAL FIBRES

(75) Inventor: Francois Gonthier, Quebec (CA)

(73) Assignee: Genia Photononics Inc., Laval (CA)

( * ) Notice: Subject to any disclaimer, the term of this patent is extended or adjusted under 35 U.S.C. 154(b) by 304 days.

(21) Appl. No.: 13/574,591

(22) PCT Filed: Jan. 24, 2011

(86) PCT No.: PCT/CA2011/000082
§ 371 (c)(1),
(2), (4) Date: Jul. 20, 2012

(87) PCT Pub. No.: WO2011/088569
PCT Pub. Date: Jul. 28, 2011

(65) Prior Publication Data
US 2012/0301079 A1 Nov. 29, 2012

Related U.S. Application Data

(60) Provisional application No. 61/282,322, filed on Jan. 22, 2010.

(51) Int. Cl.
*G02B 6/36* (2006.01)
*G02B 6/44* (2006.01)
G02B 6/42 (2006.01)
H01S 3/067 (2006.01)
G02B 6/28 (2006.01)

(52) U.S. Cl.
CPC ............ *G02B 6/2804* (2013.01); *G02B 6/4296* (2013.01); *H01S 3/06733* (2013.01); *G02B 6/2808* (2013.01); *G02B 6/2852* (2013.01); *G02B 6/4475* (2013.01)
USPC .............................................. 385/43; 385/39

(58) Field of Classification Search
CPC ................................ G02B 6/43; G02B 6/4475
USPC .......................................................... 385/43
See application file for complete search history.

(56) References Cited

U.S. PATENT DOCUMENTS 5,048,026 A 9/1991 Shaw et al.
5,140,660 A 8/1992 Takahashi
(Continued)

FOREIGN PATENT DOCUMENTS

WO 2009077636 A1 6/2009

OTHER PUBLICATIONS

U.S. Appl. No. 12/448,807, entire prosecution history thereof, inventor: François Gonthier.
(Continued)

*Primary Examiner* — Sung Pak (57) ABSTRACT

An optical assembly comprising (10) an optical coupler (12) defining a coupler first end section (18), a substantially opposed coupler second end section (20) and a coupler intermediate section (22) therebetween; a coupler passageway (24) extending in the coupler intermediate section (22) and also through at least a portion of the coupler second end section (20) and defining a passageway second end aperture (30) leading into the coupler passageway (24); a coupler peripheral surface (26) extending peripherally to the coupler passageway (24) in the coupler intermediate section (22); and a coupler lateral aperture (28) extending between the coupler passageway (24) and the coupler peripheral surface (26) in the coupler intermediate section (22). A first end optical fiber (14) is optically coupled to the optical coupler (12) in the coupler first end section (18) for allowing propagation of light between the optical coupler (12) and the first end optical fiber (14). An inside optical fiber (16) extends through the coupler lateral aperture (28) and at least part of the coupler passageway (24) in a direction leading toward the passageway second end aperture (30).

23 Claims, 4 Drawing Sheets

(56) References Cited

U.S. PATENT DOCUMENTS

| | | |
|---|---|---|
| 5,598,496 A | 1/1997 | Anderson et al. |
| 5,647,042 A | 7/1997 | Ochiai et al. |
| 5,737,464 A | 4/1998 | Underwood et al. |
| 5,778,126 A | 7/1998 | Saitoh |
| 6,079,882 A | 6/2000 | Chien |
| 6,385,371 B1 | 5/2002 | Li |
| 6,400,137 B1 | 6/2002 | Muzslay et al. |
| 6,419,810 B1 | 7/2002 | Tanaka et al. |
| 6,623,176 B2 | 9/2003 | Jack et al. |
| 6,731,837 B2 | 5/2004 | Goldberg et al. |
| 7,063,466 B2 | 6/2006 | Ferguson |
| 7,083,332 B2 | 8/2006 | Mukouda |
| 7,204,645 B2 | 4/2007 | Brown |
| 7,277,612 B2 | 10/2007 | Sintov |
| 7,306,376 B2 | 12/2007 | Scerbak et al. |
| 7,720,340 B2 | 5/2010 | Lewis et al. |
| 7,991,255 B2 * | 8/2011 | Salokatve ............ 385/43 |
| 8,346,038 B2 * | 1/2013 | Gonthier ............ 385/43 |
| 2002/0146214 A1 | 10/2002 | Tanaka et al. |
| 2003/0002813 A1 | 1/2003 | Mukouda |
| 2003/0039450 A1 | 2/2003 | Page et al. |
| 2005/0094952 A1 | 5/2005 | Gonthier et al. |
| 2007/0031088 A1 | 2/2007 | Lu |
| 2008/0050069 A1 | 2/2008 | Skovgaard et al. |

OTHER PUBLICATIONS

US Patent 7,539,377, entire prosecution history thereof, inventor: François Gonthier.

* cited by examiner

METHOD AND DEVICE FOR OPTICALLY COUPLING OPTICAL FIBRES

This application claims the benefit of U.S. provisional application No. 61/282,322, filed on Jan. 22, 2010, the contents of which is hereby incorporated by reference in its entirety. This application is also a continuation-in-part of U.S. patent application Ser. No. 12/448,807 filed Feb. 12, 2010, which is a national phase entry of PCT application serial number PCT/CA2008/000034 filed on Jan. 10, 2008, which claims priority from U.S. provisional patent application Ser. No. 60/879,817 filed Jan. 11, 2007.

FIELD OF THE INVENTION

The present invention relates to the general field of optical fibres, and is particularly concerned with methods and devices for optically coupling optical fibres.

BACKGROUND OF THE INVENTION

There are many occurrences wherein it is desirable to optically couple two or more optical fibres to each other. For example, in optical amplification, a signal fibre carries a signal and is optically pumped using laser light having another wavelength to amplify the signal. To that effect, the laser light coming from the pump fibres is carried into the signal fibre and thereby provides the power required to amplify the signal circulating in the signal fibre.

Many techniques are available for optically coupling optical fibres to each other in this manner. For example, in one such technique, the optical fibres are stripped of their sheath and heated while positioned substantially adjacent to each other until the pump fibres are fused and optically coupled to the signal fibre. This involves deforming the pump fibres until they achieve a shape suitable for optically coupling to the signal fibre.

However, coupling the pump fibre typically occurs by deforming to a relatively large extend the pump fibre around the periphery of the cladding of the signal fibre. This creates surface tension problems that result in power losses. Since it is desirable, in many instances, to pump relatively large power into the signal fibre, these power losses may heat the optical fibres and eventually lead to failure of the optical amplifier. In addition, these methods for manufacturing optical amplifiers and other devices in which optical fibres are optically coupled to each other are relatively difficult to perform and it is relatively difficult to achieve reproducible results using these methods.

Another manner of optically coupling pump fibres to a signal fibre involves the use of a signal fibre having a relatively large diameter. Then, the pumped fibres may be axially coupled to the cladding of the signal fibre which is then deformed to achieve a shape suitable for guiding the light carried by the pump fibres into the core of the signal fibre. Once again, these methods for manufacturing optical fibres are relatively complex to implement. Also, they may lead to the creation of stresses within the coupled assemblies, as there is typically a need to handle the optical fibres and attach them to supports for packaging purposes.

U.S. Pat. No. 7,539,377 issued to Gonthier on May 26, 2009, describes multiple ways of fabricating fiber optics combiners usable for example for signal feed-through using a coupling piece. However, the through (or signal) fibre is coupled to the combiner in the middle of a bundle of input (or pump) fibres. This creates difficulties in assembly of the resulting component in many configurations.

Against this background, there exists a need in the industry to provide an improved methods and devices for optically coupling optical fibres. An object of the present invention is therefore to provide such methods and devices for optically coupling optical fibres.

SUMMARY OF THE INVENTION

In a broad aspect, the invention provides an optical assembly, the optical assembly comprising: an optical coupler, the optical coupler defining a coupler first end section, a substantially opposed coupler second end section and a coupler intermediate section extending therebetween; a coupler passageway extending in the coupler intermediate section, the coupler passageway also extending through at least a portion of the coupler second end section and defining a passageway second end aperture leading into the coupler passageway in the coupler second end section; a coupler peripheral surface extending peripherally to the coupler passageway in the coupler intermediate section; and a coupler lateral aperture extending between the coupler passageway and the coupler peripheral surface in the coupler intermediate section. At least one first end optical fibre is optically coupled to the optical coupler in the coupler first end section for allowing propagation of light between the optical coupler and the at least one first end optical fibre. An inside optical fibre extends through the coupler lateral aperture and at least part of the coupler passageway in a direction leading toward the passageway second end aperture. The coupler lateral aperture allows insertion of the inside optical fibre in the coupler passageway at a location spaced apart from the at least one first end optical fibre.

Advantageously, the optical coupler allows to relatively easily assemble together the optical coupler, the first end optical fibres and the inside optical fibre to each other. Furthermore, the optical coupler and optical fibres assembly is relatively robust and relatively efficient in transmitting power between the first end optical fibre and the inside optical fibre.

Another advantage of the present optical coupler resides in the possibility to optically couple to many types of optical fibre that are often difficult to couple to conventionally, such as for example monomode fibres, polarisation-maintaining fibres and microstructured fibres, among other possibilities.

The present invention has also an advantage that it facilitates the coupling of optical fibres that are heat sensitive as the inside optical fibre may be glued to the optical coupler if required. Furthermore, since the first end optical fibre may be fused with the optical coupler before inserting the inside optical fibre, the inside optical fibre can also be heat sensitive and nevertheless be used with the proposed optical coupler according to the invention.

In some embodiments of the invention, the coupler second end section defines a second end section tapered section tapering in a direction leading from the coupler first end section toward the coupler second end section, the second end section tapered section being configured and sized for optically coupling the optical coupler and the inside optical fibre to each other such that the light incoming in the optical coupler from the at least one first end optical fibre is directed, at least in part, into the inside optical fibre. In an example, the second end section tapered section provides a substantially adiabatic coupling between the optical coupler and the inside optical fibre. In an example, the second end section tapered section is frusto-conical.

In some embodiments of the invention, the inside optical fibre protrudes from the coupler passageway through the passageway second end aperture.

In some embodiments of the invention, the inside optical fibre includes an inside optical fibre first section and an inside optical fibre second section, the inside optical fibre first and second sections being fused to each other in the coupler passageway.

In some embodiments of the invention, the coupler passageway is collapsed on the inside optical fibre substantially adjacent the second end section tapered section. For example, the coupler passageway and the inside optical fibre are fused to each other in the second end section tapered section.

In some embodiments of the invention, the coupler lateral aperture has a substantially arc segment shaped longitudinal cross-sectional configuration. For example, the coupler lateral aperture extends circumferentially around the coupler passageway over at most half of the circumference of the coupler passageway. This is advantageous to avoid losses due to a reduction in numerical aperture when the numerical aperture of the first end optical fibres is suitable chosen.

In some embodiments of the invention, a plurality of first end optical fibres are each optically coupled to the optical coupler substantially adjacent the coupler first end section for allowing propagation of the light between the optical coupler and each of the first end optical fibres.

In some embodiments of the invention, the coupler second end section is substantially cylindrical and defines a second end section end surface, the optical coupler being configured and sized for transmitting the light from the optical coupler to the at least one first end optical fibre when the light enters the optical coupler from the second end section end surface. For example, the second end section end surface is substantially planar and substantially perpendicular to the coupler second end section.

In some embodiments of the invention, the coupler first end section is substantially cylindrical substantially adjacent the at least one first end optical fibre and defines a first end section end surface, the optical coupler and the at least one first end optical fibre being optically coupled to each other through the first end section end surface. In other embodiments of the invention, the coupler first end section defines a first end section tapered section tapering in a direction leading from the coupler second end section toward the at least one first end optical fibre. For example, the coupler first end section defines a first end section end surface, the optical coupler and the at least one first end optical fibre being optically coupled to each other through the first end section end surface.

In some embodiments of the invention, the coupler passageway is substantially rectilinear. For example, the coupler passageway is substantially cylindrical. In other embodiments of the invention, the coupler passageway includes a passageway curved section substantially in register with the coupler lateral aperture.

In some embodiments of the invention, the optical coupler has a generally circular transversal cross-sectional configurations along at least a portion thereof. In other embodiments of the invention, the optical coupler has generally polygonal transversal cross-sectional configurations along at least a portion thereof.

In some embodiments of the invention, the optical coupler is an internal optical coupler, the optical assembly further comprising an external optical coupler substantially similar in configuration to the internal optical coupler, the external optical coupler being larger than the internal optical coupler, the external optical coupler receiving the internal optical coupler through the coupler lateral aperture of the external optical coupler and into the coupler passageway of the external optical coupler.

In another broad aspect, the invention provides an optical coupler for optically coupling at least one first end optical fibre thereto and for receiving an inside optical fibre, the optical coupler comprising: a coupler first end section, a substantially opposed coupler second end section and a coupler intermediate section extending therebetween; the optical coupler defining a coupler passageway extending in the coupler intermediate section, the coupler passageway also extending through at least a portion of the coupler second end section and defining a passageway second end aperture leading into the coupler passageway in the coupler second end section; the optical coupler also defining a coupler peripheral surface extending peripherally to the coupler passageway in the coupler intermediate section and a coupler lateral aperture extending between the coupler passageway and the coupler peripheral surface in the coupler intermediate section; the coupler first end section defining a first end section coupling surface for optically coupling the at least one first end optical fibre and the optical coupler to each other for allowing propagation of light between the optical coupler and the at least one first end optical fibre; and the coupler lateral aperture and the coupler passageway being configured and sized for receiving the inside optical fibre such that the inside optical fibre extends through the coupler lateral aperture and at least part of the coupler passageway in a direction leading toward the coupler second end section. The coupler lateral aperture allows insertion of the inside optical fibre in the coupler passageway at a location spaced apart from the at least one first end optical fibre.

Other objects, advantages and features of the present invention will become more apparent upon reading of the following non-restrictive description of preferred embodiments thereof, given by way of example only with reference to the accompanying drawings.

DETAILED DESCRIPTION

Figure 1:
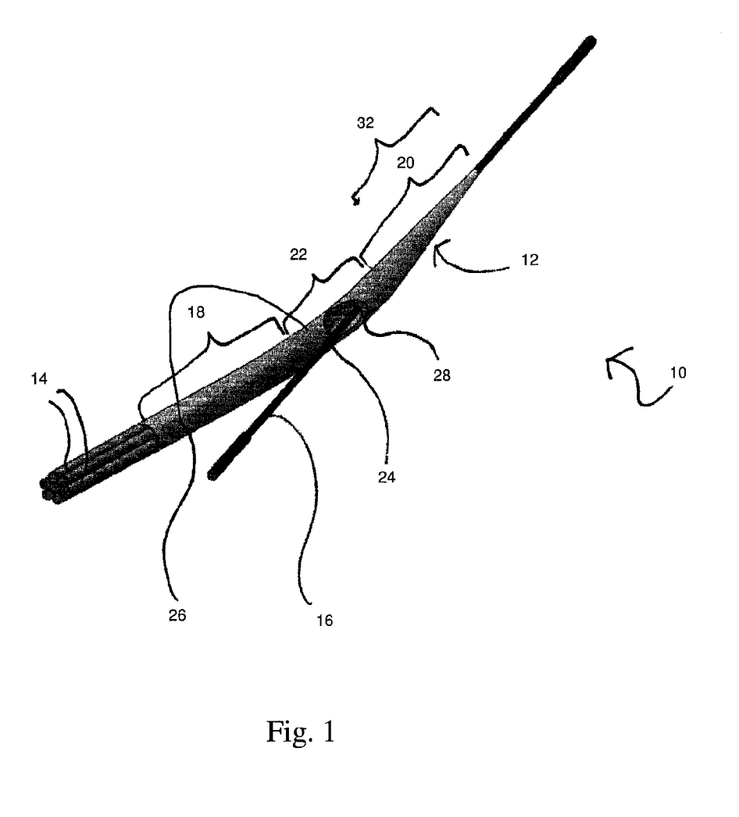
FIG. 1, in a perspective view, illustrates an optical assembly in accordance with an embodiment of the present invention.

Referring to FIG. 1, there is shown an optical assembly 10. The optical assembly 10 includes an optical coupler 12, at least one first end optical fibre 14 and an inside optical fibre 16. The optical assembly 10 is shown with seven first end optical fibres 14, but the inclusion any other suitable number, such as a plurality, of first end optical fibres 14 is within the scope of the invention.

The optical coupler 12 defines a coupler first end section 18, a substantially opposed coupler second end section 20 and a coupler intermediate section 22 extending therebetween. The coupler first end, second end and intermediate sections 18, 20 and 22 are shown in the drawings as distinct entities extending from each other and delimited by solid lines to illustrate clearly an example of their embodiments. However, in alternative embodiments of the invention, these delimitations are different in dimensions and shapes from the illustrated version in any suitable manner. Also, typically, the coupler first end, second end and intermediate sections 18, 20 and 22 extend continuously from each other without any significant change in material composition or properties, although such changes are within the scope of the invention.

Figure 2:
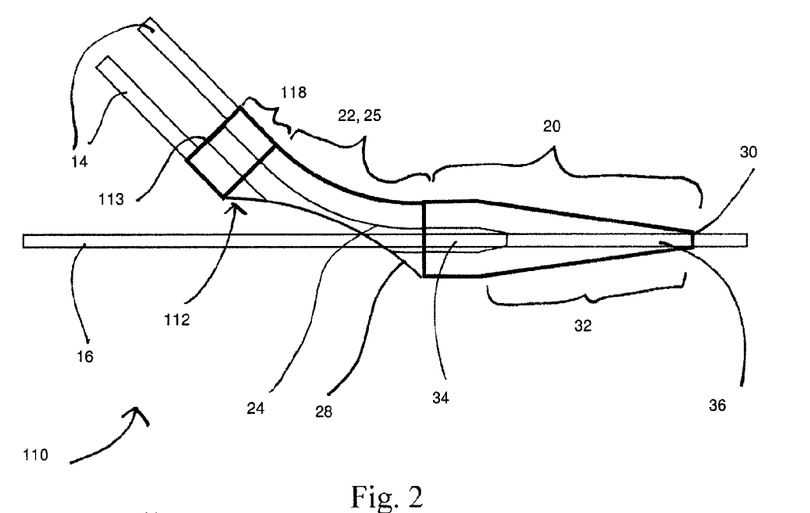
FIG. 2, in a side elevation view, illustrates an optical assembly in accordance with an alternative embodiment of the present invention.

A coupler passageway 24 extends in the coupler intermediate section 22, the coupler passageway 24 also extending through at least a portion of the coupler second end section 20 and defining a passageway second end aperture 30, seen for example in FIG. 2. The passageway second end aperture 30 leads into the coupler passageway 24 in the coupler second end section 20. In the embodiments of the invention shown in the drawings, the coupler passageway 24 extends throughout the whole coupler second end section 20. However, other configurations are within the scope of the present invention. A coupler peripheral surface 26 extends peripherally to the coupler passageway 24 in the coupler intermediate section 22 and a coupler lateral aperture 28 extends between the coupler passageway 24 and the coupler peripheral surface 26 in the coupler intermediate section 22.

The first end optical fibres 14 are each optically coupled to the optical coupler 12 in the coupler first end section 18 for allowing propagation of light between the optical coupler 12 and each of the first end optical fibres 14. Typically, the first end optical fibres 14 are optically coupled to the free end of the coupler first end section 18, which therefore defines a first end section coupling surface (such as surface 113 shown in FIG. 2) for optically coupling the first end optical fibres 14 and the optical coupler 12 to each other. However, in alternative embodiments of the invention, the first end optical fibres 14 are optically coupled to the coupler first end section 18 at any other suitable location. The first end optical fibres 14 are fused, glued, or otherwise attached to the optical coupler 12.

The inside optical fibre 16 extends through the coupler lateral aperture 28 and at least part of the coupler passageway 24 in a direction leading toward the coupler second end section 20. For example, as seen in FIG. 1, the inside optical fibre 16 protrudes from the coupler passageway 24 through the passageway second end aperture 30. However, in alternative embodiments of the invention, the inside optical fibre 16 terminates at the passageway second end aperture 30 or terminates inside the coupler passageway 24.

The coupler lateral aperture 28 allows insertion of the inside optical fibre 16 in the coupler passageway 24 at a location spaced apart from the first end optical fibres 14. This facilitates manufacturing of the optical assembly 10. For example, this allows fusing the first end optical fibres 14 to the optical coupler 12 without damaging the inside optical fibre 16, which could occur if the inside optical fibre was adjacent the first end optical fibres 14 when heat is applied for fusing. Also, this configuration facilitates in some embodiments insertion of the inside optical fibre 16 in the coupler passageway 24 as the inside optical fibre 16 is guided naturally towards the coupler passageway 24 when inserted by the shape of the optical coupler 12.

In some embodiments of the invention, the coupler second end section 20 defines a second end section tapered section 32 tapering in a direction leading from the coupler first end section 18 toward the coupler second end section 20. The second end section tapered section 32 is configured and sized for optically coupling the optical coupler 12 and the inside optical fibre 16 to each other such that the light incoming in the optical coupler 12 from the first end optical fibres 14 is directed, at least in part, into the inside optical fibre 16. To achieve optimal transmission of light into the inside optical fibre, in some embodiments of the invention, the second end section tapered section 32 provides a substantially adiabatic coupling between the optical coupler 12 and the inside optical fibre 16. In some embodiments of the invention, the second end section tapered section 32 is frusto-conical.

In some embodiments of the invention, the inside optical fibre 16 is a continuous piece of optical fibre. In alternative embodiments of the invention, as seen for example in FIG. 2, the inside optical fibre 16 includes an inside optical fibre first section 34 and an inside optical fibre second section 36, the inside optical fibre first and second sections 34 and 36 being fused or otherwise optically coupled to each other in the coupler passageway 24. This allows for example to keep a relatively large cladding, coating or sleeve on most of the length of the inside optical fibre 16 as only a small portion of this inside optical fibre 16 needs to be small enough to enter the coupler passageway 24 from opposite directions to allow optical coupling in the optical coupler 12.

To achieve optical coupling with the inside optical fibre 16, the coupler passageway 24 is typically collapsed on the inside optical fibre 16 substantially adjacent the second end section tapered section 32. In some embodiments of the invention, the coupler passageway 24 and the inside optical fibre 16 are fused to each other substantially adjacent the second end section tapered section 32.

In some embodiments of the invention, the coupler lateral aperture 28 has a substantially arc segment shaped longitudinal cross-sectional configuration. In other words, when seen from the side, there is an orientation of the optical coupler 12 in which the coupler lateral aperture 28 is seen as substantially arc segment shaped. Also, in order to minimize power losses in the transmission of light from the first end optical fibres 14 to the inside optical fibre 16, the coupler lateral aperture 28 typically extends circumferentially around the coupler passageway 24 over at most half of the circumference of the coupler passageway 24.

An example of an application of the optical assembly 10 resides in coupling of relatively powerful light incoming through the first end optical fibres 14 into the inside optical fibre 16. For example, the inside optical fibre 16 carries a signal to be amplified and the inside optical fibre 16 is suitably doped to permit signal amplification when the light incoming from the first end optical fibres 14 is guided into the inside optical fibre 16.

FIGS. 2 to 8 illustrate alternative optical assemblies 110, 210, 310, 410, 510, 610 and 710 including respectively alternative optical couplers 112, 212, 312, 412, 512, 612 and 712. The optical assemblies 110, 210, 310, 410, 510, 610 and 710 are substantially similar to the optical assembly 10 and reference numerals used commonly in the description of these optical assemblies 10, 110, 210, 310, 410, 510, 610 and 710 refer to substantially similar structures. Also, hereinbelow, only the differences between the optical assembly 10 and the optical assemblies 110, 210, 310, 410, 510, 610 and 710 are described in details.

The coupler first end section 18 may take various configurations. For example, as seen in the optical coupler 112 shown in FIG. 2, in some embodiments of the invention, the coupler first end section 118 is substantially cylindrical substantially adjacent the first end optical fibres 14 and defines a first end section end surface 113, the optical coupler 112 and the first end optical fibres 14 being optically coupled to each other through the first end section end surface 113. The first end section end surface 113 is typically located at the end of the optical coupler 112. In these embodiments, it is possible to have the coupler passageway 24 extending up to the first end section end surface 113. This configuration is usable, for example, in cases in which the first end optical fibres 14 are arranged in a circular configuration substantially adjacent the optical coupler 112.

Figure 3:
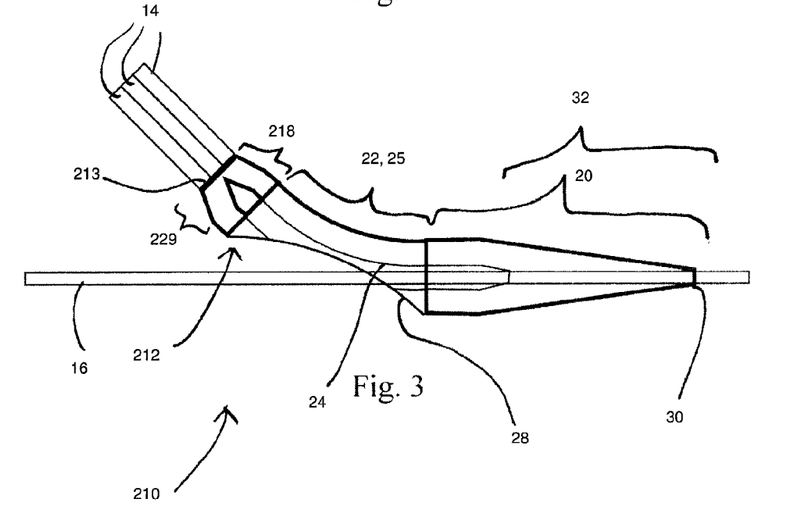
FIG. 3, in a side elevation view, illustrates an optical assembly in accordance with another alternative embodiment of the present invention.

In other embodiments of the invention, as seen in FIG. 3, the optical coupler 212 includes a coupler first end section 218 defining a first end section tapered section 219 tapering in a direction leading from the coupler second end section 20 toward the optical fibre 14. The coupler first end section 218 defines a first end section end surface 213, the optical coupler 212 and the first end optical fibres 14 being optically coupled to each other through the first end section end surface 213, which is similar to the first end section end surface 113. This configuration is usable, for example, in cases in which the first end optical fibres 14 are arranged in a bundle substantially adjacent the optical coupler 112 or in which a relatively large first end optical fibres 14 is attached to the optical coupler 112 as the first end section end surface 213 may then be provided without a central aperture.

Figure 4:
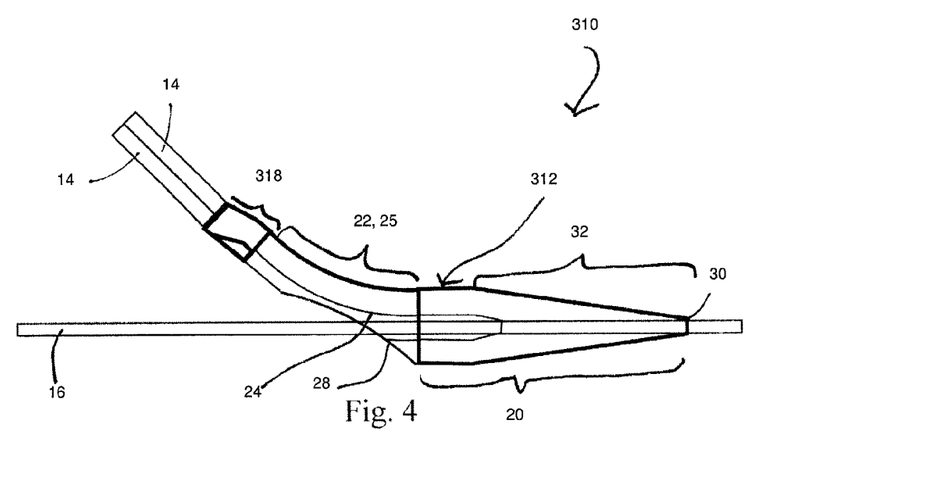
FIG. 4, in a side elevation view, illustrates an optical assembly in accordance with yet another alternative embodiment of the present invention.
Figure 5:
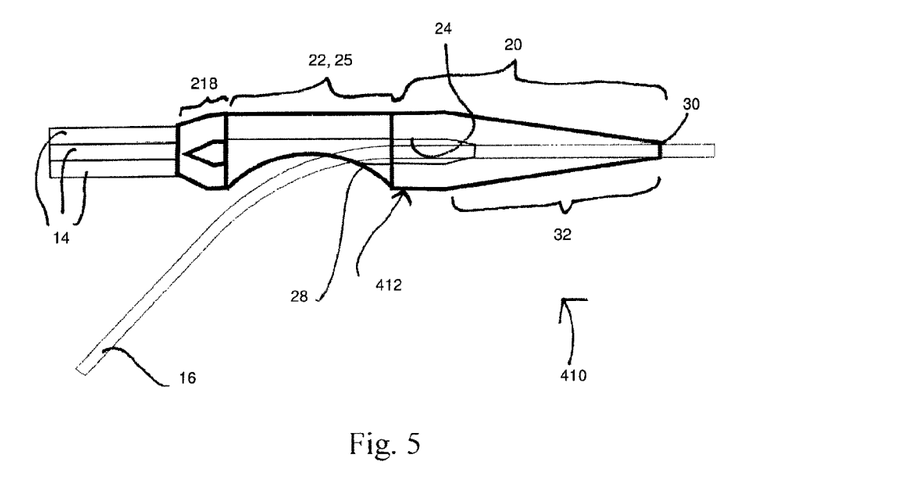
FIG. 5, in a side elevation view, illustrates an optical assembly in accordance with yet another alternative embodiment of the present invention.

In yet other embodiments, as seen in FIG. 4 for the optical assembly 310, the coupler first end section 318 is not completely rotationally symmetric and may include, for example, only a circumferential arc segment of the coupler first end sections 18, 118 and 218.

The coupler passageway 24, and the general configuration of the optical coupler 12 may take various shapes. For example, in some embodiments of the invention, the coupler passageway 24 is substantially rectilinear, for example substantially cylindrical. This is the case for optical coupler 412 shown respectively in FIG. 5. In other embodiments of the invention, the coupler passageway 24 includes a passageway curved section 25 substantially in register with the coupler lateral aperture 28. This is the case for optical couplers 12, 112, 212 and 312, 512, 612 and 613 shown respectively in FIGS. 1, 2, 3, 4, 6, 7 and 7.

Figure 6:
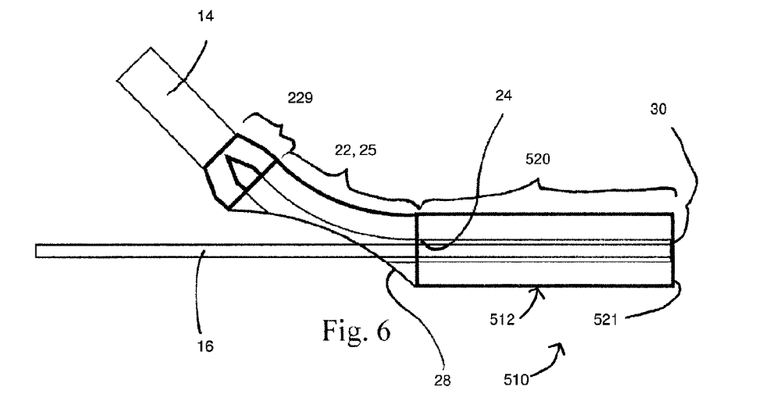
FIG. 6, in a side elevation view, illustrates an optical assembly in accordance with yet another alternative embodiment of the present invention.

With reference to FIG. 6, there is shown an alternative optical assembly 510 including an optical coupler 512 in which the coupler second end section 520 is substantially cylindrical and defines a second end section end surface 521, typically provided at the end of the optical coupler 512. The optical coupler 512 is configured and sized for transmitting light from the optical coupler 512 to the first end optical fibres 14 when the light enters the optical coupler 512 from the second end section end surface 521. Typically, the second end section end surface 521 is substantially perpendicular to the coupler second end section 520. Also, typically, the passageway second end aperture 30 is provide at the center of the second end section end surface 521.

This configuration is useful, for example, when light is conveyed by the inside optical fibre 16 to a sample (not shown in the drawings) and is reflected, scattered or otherwise emitted, after a change in wavelength or not, in a different direction by the sample. Then, this reflected or emitted light can be captured by the optical coupler 512 and conveyed to the first end optical fibres 14 for further analysis.

Figure 7:
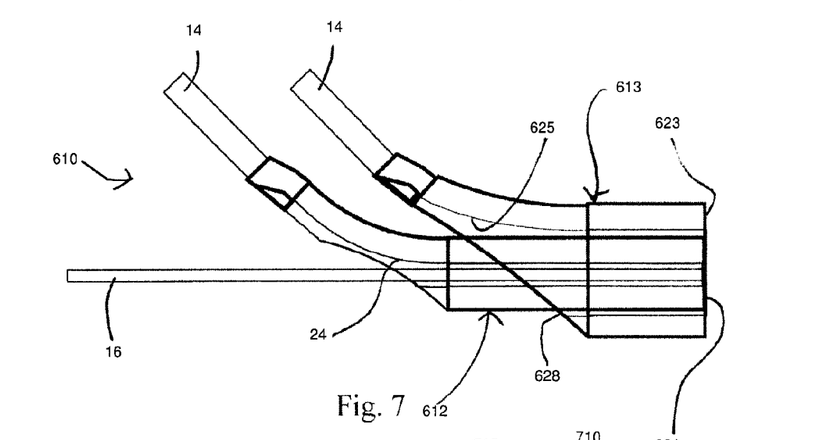
FIG. 7, in a side elevation view, illustrates an optical assembly in accordance with yet another alternative embodiment of the present invention.

Referring to FIG. 7, there is shown another alternative optical assembly 610 that includes an internal optical coupler 612 and an external optical coupler 613. The internal and external optical couplers 612 and 613 are substantially similar in configuration to the optical coupler 12, the external optical coupler 613 being larger than the internal optical coupler 612. The external optical coupler 613 receives the internal optical coupler 612 through the coupler lateral aperture 628 of the external optical coupler 613 and into the coupler passageway 625 of the external optical coupler 613. The internal and external optical couplers 612 and 613 are thus concentric and augment the light collection capacity of their second end section end surfaces 621 and 623 of the internal and external optical couplers 612 and 613.

Figure 8:
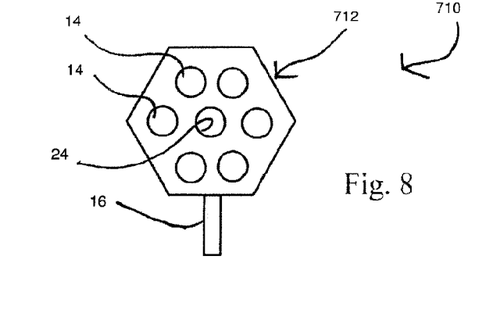
FIG. 8, in a rear elevation view, illustrates an optical assembly in accordance with yet another alternative embodiment of the present invention.

As seen in FIGS. 1 to 7, the optical assemblies 10, 110, 210, 310, 410, 510 and 610 include optical couplers 12, 112, 212, 312, 412, 512 and 612 having a generally circular transversal cross-sectional configurations along at least a portion thereof. However, in alternative embodiments of the invention, as seen in FIG. 8 for the optical assembly 710, the optical coupler 712 has generally polygonal transversal cross-sectional configurations along at least a portion thereof. While FIG. 8 illustrates an optical coupler 712 having an hexagonal transversal cross-sectional configuration, any other suitable type of polygonal transversal cross-sectional configuration is within the scope of the invention, as are transversal cross-sectional configuration that are neither circular nor polygonal.

The reader skilled in the art will readily appreciate that the various features of the optical assemblies 10, 110, 210, 310, 410, 510, 610 and 710 presented in FIGS. 1 to 8 can be combined to create different designs.

An example of a method of manufacturing the optical assembly 10 is as follows. The optical coupler 12 is formed using a substantially tubular capillary. The coupler lateral aperture 28 is formed by polishing, etching or ablating in the side of the capillary and the second end section tapered section 32 is etched or otherwise formed. Polishing of the coupler lateral aperture 28 can, for example, be performed either on a spinning cylinder or on a flat surface while holding the capillary in a curve mounting piece. Then the first end optical fibres 14 are attached to the capillary and the inside optical fiber 16 is inserted through the coupler lateral aperture 28 into the coupler passageway 24. Afterwards, the capillary is collapsed on the inside optical fiber 16 using heat or any other suitable type of energy.

Although the present invention has been described hereinabove by way of preferred embodiments thereof, it can be modified, without departing from the spirit and nature of the subject invention as defined in the appended claims.

What is claimed is:

1. An optical assembly, said optical assembly comprising:
    an optical coupler, said optical coupler defining
        a coupler first end section, a substantially opposed coupler second end section and a coupler intermediate section extending therebetween;
        a coupler passageway extending in said coupler intermediate section, said coupler passageway also extending through at least a portion of said coupler second end section and defining a passageway second end aperture leading into said coupler passageway in said coupler second end section;
        a coupler peripheral surface extending peripherally to said coupler passageway in said coupler intermediate section; and
        a coupler lateral aperture extending between said coupler passageway and said coupler peripheral surface in said coupler intermediate section;

at least one first end optical fibre optically coupled to said optical coupler in said coupler first end section for allowing propagation of light between said optical coupler and said at least one first end optical fibre; and an inside optical fibre extending through said coupler lateral aperture and at least part of said coupler passageway in a direction leading toward said passageway second end aperture;

whereby said coupler lateral aperture allows insertion of said inside optical fibre in said coupler passageway at a location spaced apart from said at least one first end optical fibre.

2. An optical assembly as defined in claim 1, wherein said coupler second end section defines a second end section tapered section tapering in a direction leading from said coupler first end section toward said coupler second end section, said second end section tapered section being configured and sized for optically coupling said optical coupler and said inside optical fibre to each other such that said light incoming in said optical coupler from said at least one first end optical fibre is directed, at least in part, into said inside optical fibre.

3. An optical assembly as defined in claim 2, wherein said second end section tapered section provides a substantially adiabatic coupling between said optical coupler and said inside optical fibre.

4. An optical assembly as defined in claim 2, wherein said inside optical fibre protrudes from said coupler passageway through said passageway second end aperture.

5. An optical assembly as defined in claim 4, wherein said inside optical fibre includes an inside optical fibre first section and an inside optical fibre second section, said inside optical fibre first and second sections being fused to each other in said coupler passageway.

6. An optical assembly as defined in claim 2, wherein said coupler passageway is collapsed on said inside optical fibre substantially adjacent said second end section tapered section.

7. An optical assembly as defined in claim 6, wherein said coupler passageway and said inside optical fibre are fused to each other in said second end section tapered section.

8. An optical assembly as defined in claim 2, wherein said second end section tapered section is frusto-conical.

9. An optical assembly as defined in claim 1, wherein said coupler lateral aperture has a substantially arc segment shaped longitudinal cross-sectional configuration.

10. An optical assembly as defined in claim 9, wherein said coupler lateral aperture extends circumferentially around said coupler passageway over at most half of the circumference of said coupler passageway.

11. An optical assembly as defined in claim 1, comprising a plurality of first end optical fibres each optically coupled to said optical coupler substantially adjacent said coupler first end section for allowing propagation of said light between said optical coupler and each of said first end optical fibres.

12. An optical assembly as defined in claim 1, wherein said coupler second end section is substantially cylindrical and defines a second end section end surface, said optical coupler being configured and sized for transmitting said light from said optical coupler to said at least one first end optical fibre when said light enters said optical coupler from said second end section end surface.

13. An optical assembly as defined in claim 12, wherein said second end section end surface is substantially planar and substantially perpendicular to said coupler second end section.

14. An optical assembly as defined in claim 1, wherein said coupler first end section is substantially cylindrical substantially adjacent said at least one first end optical fibre and defines a first end section end surface, said optical coupler and said at least one first end optical fibre being optically coupled to each other through said first end section end surface.

15. An optical assembly as defined in claim 1, wherein said coupler first end section defines a first end section tapered section tapering in a direction leading from said coupler second end section toward said at least one first end optical fibre.

16. An optical assembly as defined in claim 15, wherein said coupler first end section defines a first end section end surface, said optical coupler and said at least one first end optical fibre being optically coupled to each other through said first end section end surface.

17. An optical assembly as defined in claim 1, wherein said coupler passageway is substantially rectilinear.

18. An optical assembly as defined in claim 1, wherein said coupler passageway includes a passageway curved section substantially in register with said coupler lateral aperture.

19. An optical assembly as defined in claim 1, wherein said coupler passageway is substantially cylindrical.

20. An optical assembly as defined in claim 1, wherein said optical coupler has a generally circular transversal cross-sectional configurations along at least a portion thereof.

21. An optical assembly as defined in claim 1, wherein said optical coupler has generally polygonal transversal cross-sectional configurations along at least a portion thereof.

22. An optical assembly as defined in claim 1, wherein said optical coupler is an internal optical coupler, said optical assembly further comprising an external optical coupler substantially similar in configuration to said internal optical coupler, said external optical coupler being larger than said internal optical coupler, said external optical coupler receiving said internal optical coupler through said coupler lateral aperture of said external optical coupler and into said coupler passageway of said external optical coupler.

23. An optical coupler for optically coupling at least one first end optical fibre thereto and for receiving an inside optical fibre, said optical coupler comprising:

a coupler first end section, a substantially opposed coupler second end section and a coupler intermediate section extending therebetween;

said optical coupler defining a coupler passageway extending in said coupler intermediate section, said coupler passageway also extending through at least a portion of said coupler second end section and defining a passageway second end aperture leading into said coupler passageway in said coupler second end section;

said optical coupler also defining a coupler peripheral surface extending peripherally to said coupler passageway in said coupler intermediate section and a coupler lateral aperture extending between said coupler passageway and said coupler peripheral surface in said coupler intermediate section;

said coupler first end section defining a first end section coupling surface for optically coupling said at least one first end optical fibre and said optical coupler to each other for allowing propagation of light between said optical coupler and said at least one first end optical fibre; and said coupler lateral aperture and said coupler passageway being configured and sized for receiving said inside optical fibre such that said inside optical fibre extends through said coupler lateral aperture and at least part of said coupler passageway in a direction leading toward said coupler second end section;

whereby said coupler lateral aperture allows insertion of said inside optical fibre in said coupler passageway at a location spaced apart from said at least one first end optical fibre.

* * * * *